US009785819B1

(12) United States Patent
Oreifej

(10) Patent No.: US 9,785,819 B1
(45) Date of Patent: Oct. 10, 2017

(54) SYSTEMS AND METHODS FOR BIOMETRIC IMAGE ALIGNMENT

(71) Applicant: Synaptics Incorporated, San Jose, CA (US)

(72) Inventor: Omar Oreifej, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 15/199,819

(22) Filed: Jun. 30, 2016

(51) Int. Cl.
*G06K 9/00* (2006.01)
*G06T 7/00* (2017.01)
*G06K 9/62* (2006.01)

(52) U.S. Cl.
CPC ....... *G06K 9/00013* (2013.01); *G06K 9/6215* (2013.01); *G06T 7/0036* (2013.01)

(58) Field of Classification Search
None
See application file for complete search history.

(56) References Cited

U.S. PATENT DOCUMENTS

| 5,325,449 | A | 6/1994 | Burt et al. |
| 5,649,032 | A | 7/1997 | Burt et al. |
| 5,991,444 | A | 11/1999 | Burt et al. |
| 5,999,662 | A | 12/1999 | Burt et al. |
| 6,249,616 | B1 | 6/2001 | Hashimoto |
| 6,393,163 | B1 | 5/2002 | Burt et al. |
| 6,668,072 | B1 | 12/2003 | Hribernig et al. |
| 7,046,829 | B2 * | 5/2006 | Udupa ............... G06K 9/00087 340/5.53 |
| 7,085,403 | B2 | 8/2006 | Ailisto et al. |
| 7,142,699 | B2 | 11/2006 | Reisman et al. |
| 7,587,064 | B2 | 9/2009 | Owechko et al. |
| 7,599,530 | B2 | 10/2009 | Boshra |
| 7,609,866 | B2 | 10/2009 | Fujii |

(Continued)

FOREIGN PATENT DOCUMENTS

WO    WO 9307584 A1    4/1993

OTHER PUBLICATIONS

Yager, et al., "Coarse Fingerprint Registration Using Orientation Fields," *Journal on Applied Signal Processing*, 2005:13, 2043-2053 (2005).

(Continued)

*Primary Examiner* — Manav Seth
*Assistant Examiner* — David Perlman
(74) *Attorney, Agent, or Firm* — Leydig, Voit & Mayer, Ltd.

(57) ABSTRACT

Systems and methods for aligning images are disclosed. A method includes receiving an input image of a biometric object; identifying a plurality of sets of candidate transformations, wherein each set of candidate transformations included in the plurality of sets of candidate transformations aligns the input image to a different enrollment image included in a plurality of enrollment images; grouping the plurality of sets of candidate transformations into a combined set of candidate transformations; selecting a subset of candidate transformations from the combined set of candidate transformations; and, identifying a first transformation based on the selected subset of candidate transformations, wherein the first transformation aligns the input image to a first enrollment image included in the plurality of enrollment images.

29 Claims, 8 Drawing Sheets

(56) References Cited

U.S. PATENT DOCUMENTS

| | | |
|---|---|---|
| 7,616,787 B2 | 11/2009 | Boshra |
| 7,672,528 B2 | 3/2010 | Gallagher et al. |
| 7,809,211 B2 | 10/2010 | Taraba et al. |
| 8,098,906 B2 | 1/2012 | Shuckers et al. |
| 8,229,250 B2 | 7/2012 | Suzuki et al. |
| 8,295,560 B2 | 10/2012 | Abiko |
| 8,358,870 B2 | 1/2013 | Abiko |
| 8,565,497 B2 | 10/2013 | Nada et al. |
| 8,634,604 B2 | 1/2014 | Jahromi |
| 8,723,953 B2 | 5/2014 | Klomp et al. |
| 2004/0218790 A1 | 11/2004 | Ping Lo |
| 2009/0097722 A1* | 4/2009 | Dekel ............ G06T 15/10 382/128 |
| 2010/0183230 A1 | 7/2010 | Huang |
| 2012/0082385 A1 | 4/2012 | Xu et al. |
| 2014/0225902 A1 | 8/2014 | Zhu et al. |
| 2014/0226879 A1 | 8/2014 | Westerman et al. |
| 2014/0270420 A1 | 9/2014 | Boshra |
| 2015/0007243 A1 | 1/2015 | Kunkel et al. |
| 2017/0140193 A1* | 5/2017 | Wang ............ G06K 9/001 |

OTHER PUBLICATIONS

Yager, et al., "Fingerprint Alignment using a Two state Optimization," *Elsevier, Pattern Recognition Letters*, 27, 317-324 (2006).

Ong, et al., "Fingerprint Images Segmentation Using Two Stages Coarse to Fine Discrimination Technique," *LNAI* 2903, 624-633 (2003).

Cao, et al, "Segmentation and Enhancement of Latent Fingerprints: A Coarse to Fine Ridgestructure Dictionary", IEEE Trans. Pattern Anal. Mach. Intell., 36 (2) (2014).

"Pyramid (image processing)"—Wikipedia, downloaded from http://en.wikipedia.org/wiki/pyramid_(image_processing), download Feb. 26, 2015.

Adelson, et al., "Pyramid Methods in Image Processing," *RCA Engineer*, 29-6, pp. 33-41 (1984).

* cited by examiner

View 1
1. Transform 1-1
2. Transform 2-1
3. Transform 3-1
4. Transform 4-1
5. Transform 5-1

View 2
1. Transform 1-2
2. Transform 2-2
3. Transform 3-2
4. Transform 4-2
5. Transform 5-2

View 3
1. Transform 1-3
2. Transform 2-3
3. Transform 3-3
4. Transform 4-3
5. Transform 5-3

Combined Set
1. Transform 1-2
2. Transform 2-2
3. Transform 1-1
4. Transform 2-1
5. Transform 3-1
6. Transform 3-2
7. Transform 4-2
8. Transform 4-1
9. Transform 5-1
10. Transform 5-2
11. Transform 1-3
12. Transform 2-3
13. Transform 3-3
14. Transform 4-3
15. Transform 5-3

FIG. 9

SYSTEMS AND METHODS FOR BIOMETRIC IMAGE ALIGNMENT

FIELD

This disclosure relates generally to the field of biometrics and, more specifically, to systems and methods for biometric image alignment.

BACKGROUND

Since its inception, biometric sensing technology, such as fingerprint sensing, has revolutionized identification and authentication processes. The ability to capture and store biometric data in a digital file of minimal size has yielded immense benefits in fields such as law enforcement, forensics, and information security.

Utilizing fingerprints in a biometric authentication process typically includes storing one or more fingerprint images captured by a fingerprint sensor as a fingerprint template for later authentication. During the authentication process, a newly acquired fingerprint image is received and compared to the fingerprint template to determine whether there is a match. Before the newly acquired fingerprint image can be compared to the fingerprint template, the newly acquired fingerprint image is aligned by performing a transformation to the newly acquired fingerprint image. The transformation may include one or more of rotation, translation (in two dimensions), and scaling of the newly acquired fingerprint image. This process is known as image alignment, which can be a time consuming stage in the biometric matching process. Fast matching is important for many applications, while determining the correct alignment is important for providing accurate biometric match results.

SUMMARY

One embodiment of the disclosure provides a computer-readable storage medium and method for biometric image alignment. The method includes: receiving an input image of a biometric object; identifying a plurality of sets of candidate transformations, wherein each set of candidate transformations included in the plurality of sets of candidate transformations aligns the input image to a different enrollment image included in a plurality of enrollment images; grouping the plurality of sets of candidate transformations into a combined set of candidate transformations; selecting a subset of candidate transformations from the combined set of candidate transformations; and, identifying a first transformation based on the selected subset of candidate transformations, wherein the first transformation aligns the input image to a first enrollment image included in the plurality of enrollment images.

Another embodiment of the disclosure provides a device, comprising a biometric sensor configured to capture an input image of a biometric object, and a processing system. The processing system is configured to: receive the input image of the biometric object; identify a plurality of sets of candidate transformations, wherein each set of candidate transformations included in the plurality of sets of candidate transformations aligns the input image to a different enrollment image included in a plurality of enrollment images; group the plurality of sets of candidate transformations into a combined set of candidate transformations; select a subset of candidate transformations from the combined set of candidate transformations; and, identify a first transformation based on the selected subset of candidate transformations, wherein the first transformation aligns the input image to a first enrollment image included in the plurality of enrollment images.

BRIEF DESCRIPTION OF THE DRAWINGS

FIG. 9 is a block diagram illustrating grouping candidate transformations from multiple views of a biometric, according to one embodiment.

DETAILED DESCRIPTION

Figure 1:
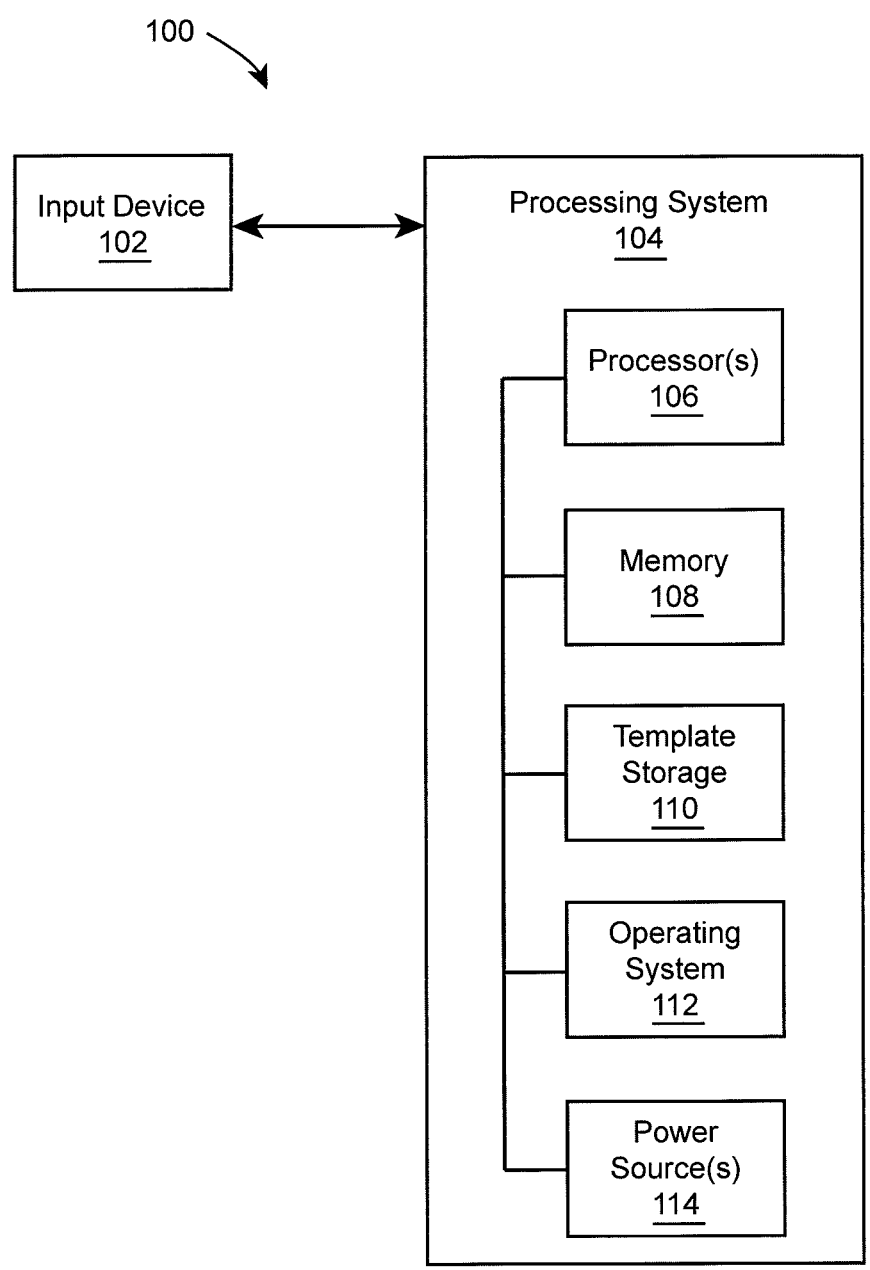
FIG. 1 is a block diagram of an example electronic system that includes an input device and a processing system, according to an embodiment of the disclosure.

Embodiments of the disclosure address the problem of image alignment for images having significant oriented texture or edges. Fingerprint images are examples of such images; however, iris images and vein patterns are other examples. As described, image alignment is a challenging problem when images are low quality or if only a small part of one image overlaps with a sub-part of another image, as is common when the images are captured using very small sensors.

Embodiments of the disclosure provide image alignment techniques that can operate on small images with few or even no minutiae points in the overlap area of the two images. Given a first image (e.g., an input image) to be aligned to a second image (e.g., an enrollment image), embodiments of the disclosure perform image alignment using multiple stages. In some embodiments, the first and second images are skeletonized fingerprint images. Fingerprint skeletonization, also referred to as thinning, is the process of converting the ridge lines in a grayscale fingerprint image to a binary representation, and reducing the width of binarized ridge lines to one pixel wide.

As described in greater detail herein, in one implementation, an input image of a biometric object is received. A plurality of sets of candidate transformations is identified, where each set of candidate transformations in the plurality of sets of candidate transformations aligns the input image to a different enrollment image in a plurality of enrollment images. The different enrollment images could be from the same template (e.g., from the same finger) or from different templates (e.g., from different fingers). The plurality of sets of candidate transformations are "grouped" into a combined set of candidate transformations and sorted based on a difference metric between the input image aligned with the enrollment image. A subset of candidate transformations from the combined set of candidate transformations is then selected. The subset can be selected by choosing a top number of candidate transformations that minimize the difference metric between the aligned the input image and respective enrollment image. Further processing is then performed on the subset of candidate transformations to identify a transformation that minimizes the difference metric. The transformation that minimizes the difference metric can then be used, for example, in an authentication attempt (such as, for example, to unlock a mobile device).

In greater detail, at a first stage, coarse representations of the first and second images are generated. In some embodiments, the coarse representations may be orientation maps of the respective images. In other embodiments, the coarse representations may be density maps, phase maps, intensity maps, or any other suitable representation of the respective images. In still further embodiments, the coarse representation could be a representation of a set of points of interest in the respective images. In some embodiments, the coarse representations are representations of the images that can be but are not necessarily lower resolution (i.e., dimensions), as described in greater detail herein.

In a second stage, in some embodiments, the coarse representations are smoothed and sampled to generate smaller dimension (i.e., lower resolution) coarse representations. In some embodiments, the smaller dimension coarse representations are further smoothed and sampled in third and subsequent stages.

If smoothing and sampling are performed, in some embodiments, a "pose search" is performed on the smallest coarse representations to determine the candidate transformations that best align the smallest coarse representation of the first image to the smallest coarse representation of the second image. In some embodiments, a pose search is a type of exhaustive search that examines all possibilities of transformations that can align a given image to another image. Since the smallest coarse representations are relatively smaller dimension images than the first and second images, the pose search can be done relatively quickly.

The result of the pose search for a given second image is a first set of transformation hypotheses that best align the smallest coarse representation of the first image to the smallest coarse representation of the given second image. For example, the results of the pose search are ranked according to a similarity measure, such as a difference metric, and the top N transformation hypotheses are selected to be included in the first set transformation hypothesis.

In some embodiments, the second image may represent one "view" of a biometric template. For example, in fingerprint matching, each finger can comprise a separate template. Each template (i.e., finger) could be represented by multiple views of the template. For example, during the enrollment process, multiple images of the same finger can be captured and stored as different enrollment images for the finger. When the pose search is performed to determine the candidate transformations that best align the smallest coarse representation of the first image to the smallest coarse representation of the second image, the pose search is performed for each view separately, resulting in a plurality of sets of transformation hypotheses.

After the pose search is performed for each view for a template (or for multiple views across multiple templates), the results are "grouped" into a combined set of candidate transformations corresponding to multiple views. The combined set of candidate transformations is then sorted according to a similarity measure. A top number of the combined set of candidate transformations is selected as a subset from the combined set of candidate transformations. For example, the top 60-80% of the candidate transformations may be selected. Further processing is then performed on the subset of candidate transformations to identify a transformation that minimizes the difference metric. As described in greater detail herein, the subset of candidate transformations is propagated up to the next higher resolution stage for further processing.

In this manner, by grouping the results from multiple views, the candidate transformation that minimizes the difference metric can be identified more quickly than by examining each view separately. This is because views that result in poor candidate transformations relative to the candidate transformations of other views can be skipped and are not examined.

FIG. 1 is a block diagram of an example electronic system 100 that includes an input device 102 and a processing system 104, according to an embodiment of the disclosure. The basic functional components of the electronic device 100 utilized during capturing, storing, and validating a biometric authentication attempt are illustrated. The processing system 104 includes a processor(s) 106, a memory 108, a template storage 110, an operating system (OS) 112, and a power source(s) 114. Each of the processor(s) 106, the memory 108, the template storage 110, the operating system 112 and power source 114 are interconnected physically, communicatively, and/or operatively for inter-component communications.

As illustrated, processor(s) 106 are configured to implement functionality and/or process instructions for execution within electronic device 100 and the processing system 104. For example, processor 106 executes instructions stored in memory 108 or instructions stored on template storage 110 to determine whether a biometric authentication attempt is successful or unsuccessful. Memory 108, which may be a non-transitory, computer-readable storage medium, is configured to store information within electronic device 100 during operation. In some embodiments, memory 108 includes a temporary memory, an area for information not to be maintained when the electronic device 100 is turned off. Examples of such temporary memory include volatile memories such as random access memories (RAM), dynamic random access memories (DRAM), and static random access memories (SRAM). Memory 108 also maintains program instructions for execution by the processor 106.

Template storage 110 comprises one or more non-transitory computer-readable storage media. In the context of a fingerprint sensor, the template storage 110 is generally configured to store enrollment views for fingerprint images for a user's fingerprint or other enrollment information. The template storage 110 may further be configured for long-term storage of information. In some examples, the template storage 110 includes non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories, among others.

The processing system 104 also hosts an operating system (OS) 112. The operating system 112 controls operations of the components of the processing system 104. For example, the operating system 112 facilitates the interaction of the processor(s) 106, memory 108 and template storage 110. According to various embodiments, the processor(s) 106 implement hardware and/or software to align two images and compare the aligned images to one another to determine whether there is a match, as described in greater detail below.

The processing system 104 includes one or more power sources 114 to provide power to the electronic device 100. Non-limiting examples of power source 114 include single-use power sources, rechargeable power sources, and/or power sources developed from nickel-cadmium, lithium-ion, or other suitable material.

Input device 102 can be implemented as a physical part of the electronic system 100, or can be physically separate from the electronic system 100. As appropriate, the input device 102 may communicate with parts of the electronic system 100 using any one or more of the following: buses, networks, and other wired or wireless interconnections. In some embodiments, input device 102 is implemented as a fingerprint sensor and utilizes one or more various electronic fingerprint sensing methods, techniques, and devices to capture a fingerprint image of a user. Input device 102 may utilize any type of technology to capture a biometric corresponding to a user. For example, in certain embodiments, the input device 102 may be an optical, capacitive, thermal, pressure, radio frequency (RF) or ultrasonic sensor.

Some non-limiting examples of electronic systems 100 include personal computers of all sizes and shapes, such as desktop computers, laptop computers, netbook computers, tablets, web browsers, e-book readers, and personal digital assistants (PDAs). Additional example electronic systems 100 include composite input devices, such as physical keyboards and separate joysticks or key switches. Further example electronic systems 100 include peripherals such as data input devices (including remote controls and mice) and data output devices (including display screens and printers). Other examples include remote terminals, kiosks, video game machines (e.g., video game consoles, portable gaming devices, and the like), communication devices (including cellular phones, such as smart phones), and media devices (including recorders, editors, and players such as televisions, set-top boxes, music players, digital photo frames, and digital cameras).

As described in greater detail herein, embodiments of the disclosure provide systems and methods to match a newly acquired image with a template image, such as in the context of fingerprint matching. As part of the image matching process, the newly acquired image is first aligned to the template image.

Figure 2A:
FIG. 2A illustrates a grayscale fingerprint image that shows various ridges and minutiae of a fingerprint, according to one embodiment.
Figure 2B:
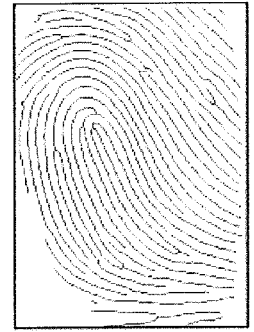
FIG. 2B illustrates a skeletonized version of the grayscale fingerprint image in FIG. 2A, according to one embodiment.

FIG. 2A illustrates a grayscale fingerprint image that shows various ridges and minutiae of a fingerprint, according to one embodiment. As can be seen in FIG. 2A, the image is noisy such that portions of the image are cloudy and the ridges or contours are broken. FIG. 2B illustrates a skeletonized version of the grayscale fingerprint image in FIG. 2A, according to one embodiment. Fingerprint skeletonization, also referred to as thinning, is the process of converting the ridge lines in a grayscale fingerprint image (see, for example, the image in FIG. 2A) to a binary representation, and reducing the width of the binarized ridge lines to one pixel wide. In a binary representation, each pixel may be considered either a foreground pixel or a background pixel that can be represented using a single bit. In a skeletonized fingerprint image, this corresponds to ridges and valleys of the fingerprint. As can be seen in FIG. 2B, the skeletonized version of the grayscale fingerprint image removes much of the noise so that the image is no longer cloudy and the ridge lines are no longer broken.

Figure 3A:
FIG. 3A illustrates a small grayscale fingerprint image that shows various ridges and minutiae of a portion of a fingerprint, according to one embodiment.
Figure 3B:
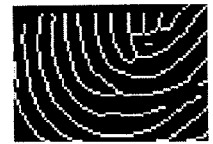
FIG. 3B illustrates a skeletonized version of the grayscale fingerprint image in FIG. 3A, according to one embodiment.

FIG. 3A illustrates a small grayscale fingerprint image that shows various ridges and minutiae of a portion of a fingerprint, according to one embodiment. As can be seen in FIG. 3A, the image is noisy such that portions of the image are cloudy and the ridges or contours are broken. Also, the image in FIG. 3A is much smaller than the image shown in FIG. 2A. This may be a result of, for example, using a smaller sensor to capture the image in FIG. 3A. FIG. 3B illustrates a skeletonized version of the grayscale fingerprint image in FIG. 3A.

Figure 4A:
FIG. 4A illustrates a skeletonized fingerprint image that shows various ridges and minutiae of a fingerprint, according to one embodiment.
Figure 4B:
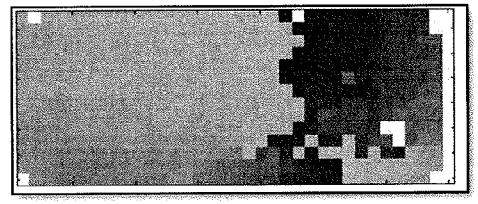
FIG. 4B illustrates an orientation map of the skeletonized fingerprint image shown in FIG. 4A, according to one embodiment.
Figure 5:
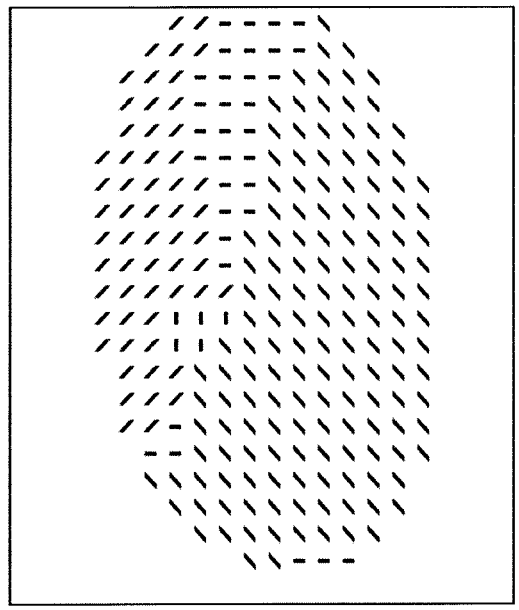
FIG. 5 is another example of an orientation map, where different orientation values at different pixels locations are represented as short line segments, according to one embodiment.

FIG. 4A illustrates a skeletonized fingerprint image that shows various ridges and minutiae of a fingerprint, according to one embodiment. FIG. 4B illustrates an orientation map of the skeletonized fingerprint image shown in FIG. 4A, according to one embodiment. As described in greater detail herein, embodiments of the disclosure provide an image alignment technique where images to be aligned are converted to smoother representations, such as orientation maps, for example. Pixels in an orientation map represent the local orientation of the ridges passing through that area of the image. In one embodiment, the orientation values range from 0° to 180°. As shown in the example in FIG. 4B, the orientation map can be presented as a series of colors or grayscale shades, with the different colors or grayscale shades representing different orientation values. FIG. 5 is another example of an orientation map, where different orientation values at different pixels locations are represented as short line segments, according to one embodiment. As described in greater detail herein, the coarse representations of the images can be smoothed and sampled to generate smoother and smaller coarse representations (e.g., smaller dimension orientation maps). Each smaller orientation map provides a coarser representation of the image from the next higher level orientation map.

Figure 6A:
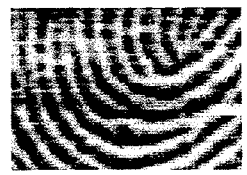
FIG. 6A illustrates a small grayscale fingerprint image that shows various ridges and minutiae of a portion of a fingerprint, according to one embodiment.
Figure 6B:
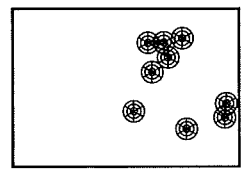
FIG. 6B illustrates a coarse point-based representation of the grayscale fingerprint image in FIG. 6A.

FIG. 6A illustrates a small grayscale fingerprint image that shows various ridges and minutiae of a portion of a fingerprint, according to one embodiment. As can be seen in FIG. 6A, the image is noisy such that portions of the image are cloudy and the ridges or contours are broken. FIG. 6B illustrates a coarse point-based representation of the grayscale fingerprint image in FIG. 6A. In some embodiments, a coarse point-based representation of an image may be generated that includes locations of points of interest. Points of interest identify regions in the image where a pattern of interest is located. Points of interest include minutiae points, but also can include other features of interest. Examples of minutiae points include a ridge ending (i.e., the abrupt end of a ridge), a ridge bifurcation (i.e., a single ridge that divides into two ridges), a short ridge, or independent ridge (i.e., a ridge that commences, travels a short distance and then ends), an island (i.e., a single small ridge inside a short ridge or ridge ending that is not connected to all other ridges), a ridge enclosure (i.e., a single ridge that bifurcates and reunites shortly afterward to continue as a single ridge), a spur (i.e., a bifurcation with a short ridge branching off a longer ridge), a crossover or bridge (i.e., a short ridge that runs between two parallel ridges), a delta (i.e., a y-shaped ridge meeting), or a core (i.e., a u-turn in the ridge pattern), among others. Other features of interest may include interesting ridge patterns that differ from surrounding ridge patterns, spirals, and pores, among others.

When performing image alignment using point-based representations, a set of interest points is identified in a first image and a set of interest points is identified in a second image. The two sets of interest points are compared to identify overlap among the two sets of interest points. Each match of one interest point in the first image to one interest point in the second image comprises a pair. Each pair provides two equations having two unknown variables that together form a transformation hypothesis. When there are at least two pairs of interest points between the first and second images, the variables of the respective equations can be solved for to determine a candidate transformation for aligning the first and second images.

As described, in one embodiment, image alignment is performed by first generating one or more levels of coarse representations of the images. Transformation hypotheses for aligning the lowest-level coarse representations are identified. The transformation hypotheses are propagated up to the next higher level and analyzed again at the next higher level to find transformation hypothesis for aligning the coarse representations at the next higher level. This process is repeated until the highest level is reached that includes the two images being aligned. The transformation hypotheses that reach the highest level are evaluated to determine which provides the best alignment of the two images.

Figure 7:
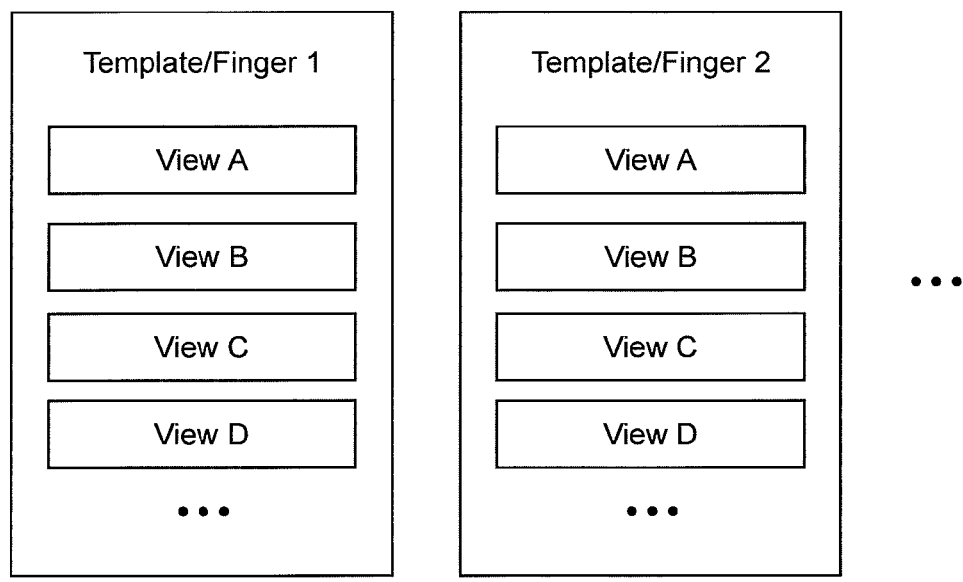
FIG. 7 is a block diagram illustrating multiple templates each being associated with multiple views, according to one embodiment.

FIG. 7 is a block diagram illustrating multiple templates each being associated with multiple views, according to one embodiment. As described, during the enrollment process, images of one or more templates (e.g., fingers) are captured. In some embodiments, each template could be represented by multiple views. In the example in FIG. 7, four different views are shown for two different templates. Additional views and templates may also be included, but are omitted from FIG. 7 for ease of description.

Figure 8:
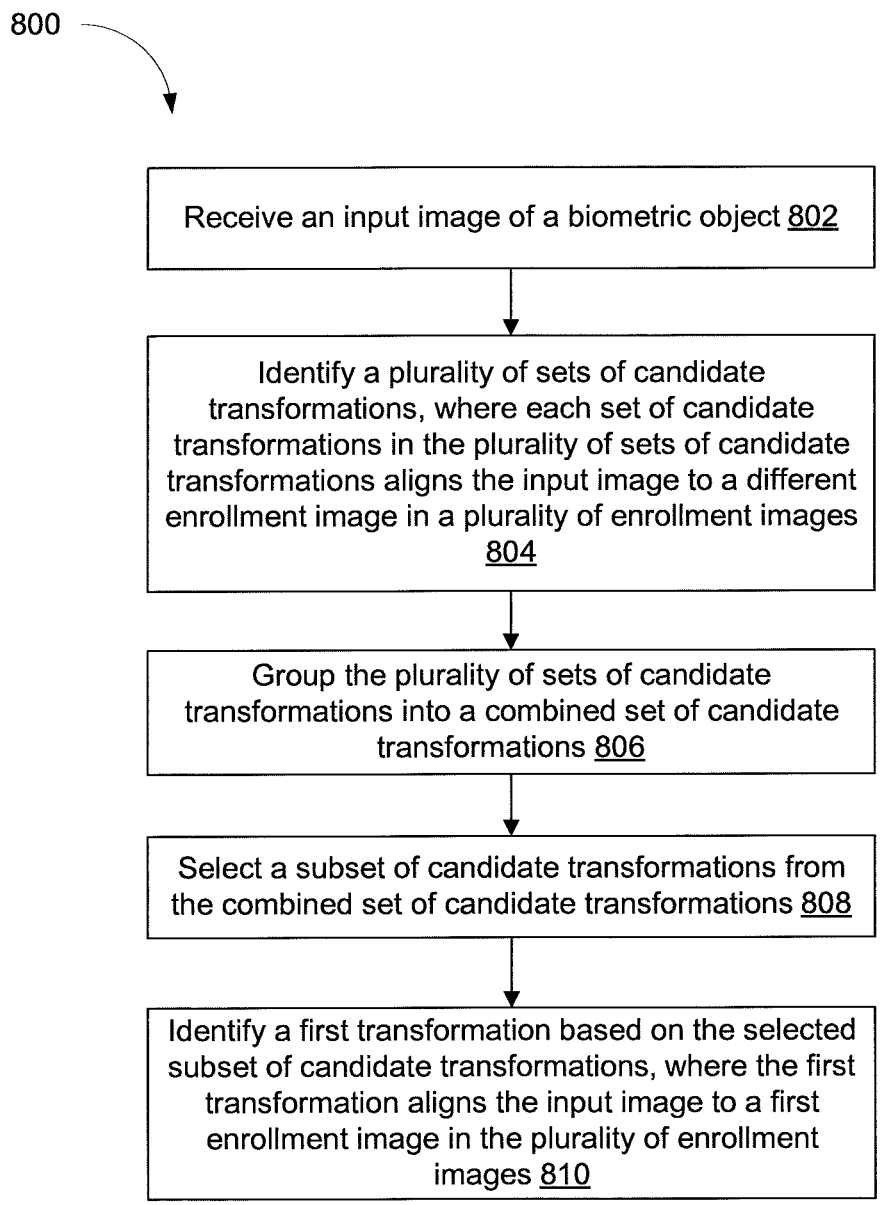
FIG. 8 is a block diagram illustrating a process for aligning two images, according to one embodiment.

FIG. 8 is a block diagram illustrating a process 800 for aligning two images, according to one embodiment. At step 802, a processing system receives an input image of a biometric. In some embodiments, the input image is a newly acquired image captured by an image sensor. For example, the biometric may be a fingerprint.

At step 804, the processing system identifies a plurality of sets of candidate transformations, where each set of candidate transformations in the plurality of sets of candidate transformations aligns the input image to a different enrollment image in a plurality of enrollment images. Each enrollment image was previously acquired during the enrollment process. The input image is being compared to the enrollment images to determine whether there is a match.

At step 806, the processing system groups the plurality of sets of candidate transformations into a combined set of candidate transformations. The method may further include sorting the combined set of candidate transformations based on a difference metric between the aligned input image and enrollment image. In one embodiment, alignment is based on transforming the input image by the candidate transformation and comparing the result to the enrollment image. In another embodiment, alignment is based on transforming the enrollment image by the candidate transformation and comparing the result to input image.

As shown in the example in FIG. 9, in one implementation, there may be three enrollment images (or "views") to which the input image is compared to determine whether there is a match. In practice, many more than three views may be present, but three views are shown in the example in FIG. 9 for ease of description. In FIG. 9, for each view, the set of candidate transformations includes five transformations. Again, in practice, many more than five candidate transformations may be present, but five candidate transformations are shown in the example in FIG. 9 for each view for ease of description. The three sets of five candidate transformations are combined in FIG. 9 into a combined set of candidate transformations that includes fifteen transformations. The combined set of candidate transformations is also sorted based on the difference metric associate with each candidate transformation.

Referring back to FIG. 8, at step 808, the processing system selects a subset of candidate transformations from the combined set of candidate transformations. For example, the top 60-80% of the candidate transformations is selected. In the example in FIG. 9, the top eleven (11) of the fifteen (15) candidate transformations are selected for the subset of candidate transformations.

At step 810, the processing system identifies a first transformation based on the selected subset of candidate transformations, where the first transformation aligns the input image to a first enrollment image in the plurality of enrollment images. As described in greater detail below, identifying the first transformation comprises performing further processing at one or more stages. Grouping (i.e., combining candidate transformations from different views and selecting a top number of candidate transformations) can be performed at each stage of the further processing. In this manner, by grouping the results from multiple views, the candidate transformation that minimizes the difference metric can be identified more quickly than by examining each view separately.

Figure 10:
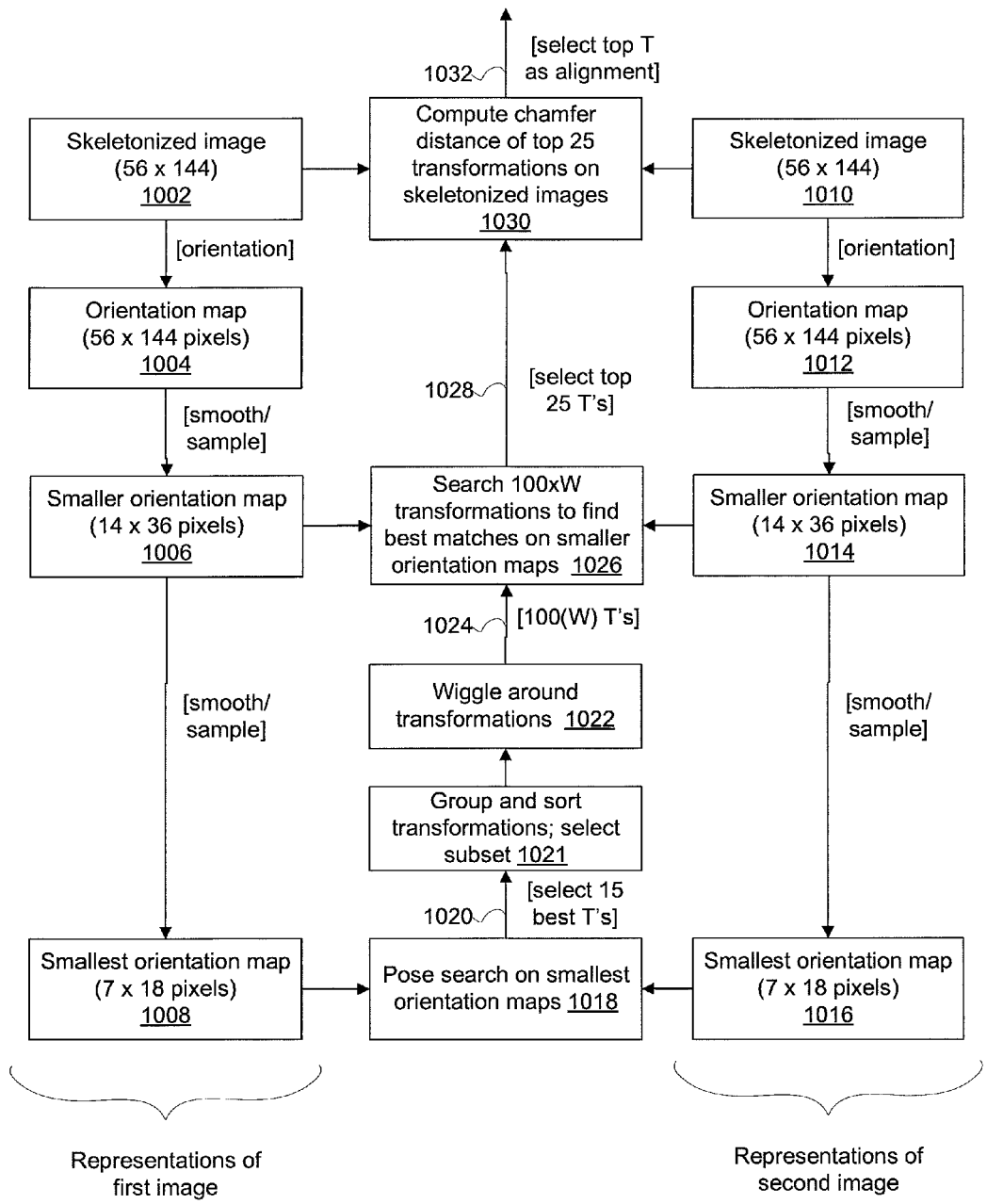
FIG. 10 is a block diagram illustrating a process for aligning two images using coarse representations of the images using grouping, according to one embodiment.

FIG. 10 is a block diagram illustrating a process for aligning two images using coarse representations of the images using grouping, according to one embodiment. In FIG. 10, a first image is being aligned to a second image. The left side of FIG. 10 shows representations of the first image. The right side of FIG. 10 shows representations of the second image. The example shown in FIG. 10 involves skeletonized images and coarse representations of the skeletonized images using orientation maps. Other implementations of coarse representations may also be used, such as interest point-based representations of the images.

The first image, which may be a grayscale fingerprint image captured by an image sensor, can be processed to generate a skeletonized image 1002. The skeletonized image 1002 has certain dimensions. In the example shown, the skeletonized image 1002 has dimensions of 56×144 pixels, although these dimensions are merely example dimensions and are not limiting. The skeletonized image 1002 is processed to generate an orientation map 1004 of the first image. In the example shown, the orientation map 1004 has the same dimensions as the skeletonized image 1002 (for example, 56×144 pixels). In some embodiments, the orientation map 1004 is computed directly from a grayscale image of a fingerprint; whereas, in other embodiments, the orientation map 1004 is computed from the skeletonized image 1002.

The orientation map 1004 is then smoothed and sampled to generate a smaller orientation map 1006. In some embodiments, smoothing is performed on the orientation map 1004 so as not to violate the Nyquist theorem. In the example shown, the smaller orientation map 1006 has dimensions of 14×36 pixels, which again are merely example dimensions and are not limiting. The smaller orientation map 1006 is then smoothed and sampled to generate a smallest orientation map 1008. In some embodiments, smoothing is performed on the smaller orientation map 1006 so as not to violate the Nyquist theorem. In the example shown, the smallest orientation map 1008 has dimensions of 7×18 pixels, which again are merely example dimensions and are not limiting. In the example shown in FIG. 10, the orientation maps are smoothed and sampled twice (i.e., two stages of smoothing/sampling), but in other embodiments any number of smoothing/sampling stages may be performed. Also, it should be noted that the label "smallest" (as in "smallest orientation map 1008") is merely a label, and it is possible to have even smaller representations of the first image that have smaller dimensions than the "smallest orientation map 1008," as so-named in FIG. 10. The example dimensions included in FIG. 10 are merely illustrative and are not limiting. Any dimensions can be used depending on implementation. For example, the skeletonized images 1002, 1010 may have the same dimensions as the orientation maps 1004, 1012. The smaller orientation maps 1006, 1014 may have dimensions that are 4 times smaller than the orientation maps 1004, 1012, and the smallest orientation maps 1008, 1016 may have dimensions that are two times smaller than the smaller orientation maps 1006, 1014. Other dimensions are also within the scope of the disclosure.

Similar to the processing done to the first image, the same processing is performed to the second image. The second image is processed to generate a skeletonized image 1010. The skeletonized image 1010 has dimensions of 56×144 pixels. The skeletonized image 1010 is processed to generate an orientation map 1012 of the second image. In the example shown, the orientation map 1012 has the same dimensions as the skeletonized image 1010 (i.e., 56×144 pixels). The orientation map 1012 then smoothed and sampled to generate a smaller orientation map 1014 having dimensions of 14×36 pixels. The smaller orientation map 1014 is then smoothed and sampled to generate a smallest orientation map 1016 having dimensions of 7×18 pixels.

In one embodiment, the smallest orientation map 1008 of the first image and the smallest orientation map 1016 of the second image are then input to a pose search operator 1018 executed by a processing system. The pose search operator 1018 performs a pose search (e.g., an exhaustive search) on the smallest orientation map 1008 of the first image to identify candidate transformations that align the smallest orientation map 1008 of the first image to the smallest orientation map 1016 of the second image. Because the smallest orientation maps 1008, 1016 are relatively small (e.g., 7×18 pixels), the number of possible combinations to search to find the best transformation is relatively small. Other embodiments may include rules to skip over portions of the search space that are far away from good alignments.

In other embodiments, such as embodiments that involve point-based representations of the images, other techniques can be used to identify the candidate transformations that align the smallest orientation map 1008 of the first image to the smallest orientation map 1016 of the second image.

At 1020, the top N best transformations that align the smallest orientation map 1008 of the first image to the smallest orientation map 1016 of the second image are selected. In the example shown, N is 15.

As described, the steps 1010, 1012, 1014, and 1016 correspond to a second image that represents an enrollment view of a finger. However, as also described, there may be multiple enrollment views of multiple figures to examine to determine whether the first image is a match. As such, the processing steps 1010, 1012, 1014, and 1016 can be repeated for each enrollment view. Also, step 1018 is repeated for each enrollment view to identify the top N transformations that align the smallest orientation map 1008 of the first image to the smallest orientation map of each respective second image corresponding to each respective enrollment view.

At step 1021, the top N transformations corresponding to each of the plurality of second images are grouped and sorted, and a subset comprising the top number of the grouped and sorted transformations is selected. As described, the top N transformations corresponding to each of the plurality of second images are grouped together. The grouping may combine all views of a single template, or may combine views from different templates. The top number may be selected as a percentage of the entire set of combined transformations; for example the top 60-80% of transformations may be selected for the subset.

The subset of transformations is then input into a wiggle operator 1022. Wiggling around a given transformation hypothesis, as used herein, comprises identifying additional transformation hypotheses that have transformation parameters that are within a neighborhood of the transformation parameters of a given transformation hypothesis in the first set of transformation hypotheses, for example within a threshold. For example, suppose a transformation hypothesis in the first set of transformation hypotheses is associated with an x-translation of +4 units, a y-translation of +6 units, and a rotation of +14 degrees (i.e., [+4, +6, +14.0], as an example shorthand notation). Additional "wiggle" transformation hypotheses can be generated for [+4.1, +6.1, +14.1] and [+3.9, +5.9, +13.9], for example (shown using the shorthand notation). Additional wiggle transformations are computed because the transformation solution computed from a lower resolution representation is likely to be close, but not exactly at, the best solution at the higher resolution representation in the next finer stage. Also, certain matching algorithms, such as ridge matching algorithms that are based on pixel-by-pixel differences between patterns in images, provide better results when there is very tight match between two images. While the first set of transformation hypotheses is determined using relatively coarse images, the best transformation hypotheses to match the higher resolution first and second images are likely to be close to the transformation hypotheses in the first set of transformation hypotheses.

The wiggle operator 1022 receives the subset of transformations and generates additional transformations that are close the transformations in the subset. Each parameter value (e.g., x-translation, y-translation, rotation) of a given transformation is wiggled within a given threshold to identify additional transformations that are close to the given transformation. For each transformation, suppose W additional transformations are generated via the wiggle operator 1022. Thus, if the subset includes 100 transformations, the number of transformations output 1024 by the wiggle operator is about 100×W transformations.

The 100×W transformations are then input into an operator 1026 that also receives the smaller orientation map 1006 of the first image and the respective smaller orientation map(s) 1014 of the respective second image(s). The operator 1026 applies each of the 100×W transformations to the smaller orientation map 1006 of the first image to identify the top M transformations of the 100×W transformations that best align the smaller orientation map 1006 of the first image to the smaller orientation map 1014 of the respective second image. In another embodiment, the transformation may be applied to the respective smaller orientation map of the second image to align the respective smaller orientation map of the second image to the smaller orientation map 1006 of the first image.

In some embodiments, the x- and y-translation values included in the 100×W transformations are scaled appropriately to account for the larger dimension of the smaller orientation maps 1006, 1014. At operator 1026, a pose search (e.g., exhaustive search) is not performed. Instead, only the 100×W transformations are analyzed, which greatly reduces the number of transformations that are analyzed that this stage compared to performing an exhaustive search at this stage. The top M transformations are output 1028 from the operator 1026. In the example shown, M is 25.

The M=25 transformations are then input into an operator 1030 that also receives the skeletonized image 1002 and the skeletonized image(s) 1010. The operator 1030 applies each of the M transformations to the skeletonized image 1002 to identify the single best transformation of the M transformations that best aligns the skeletonized image 1002 to the respective skeletonized image 1010. In another embodiment, the transformation may be applied to the respective skeletonized image 1010 to align the respective skeletonized image 1010 to the skeletonized image 1002.

The single best transformation is then output 1032 by the operator 1030. In some embodiments, an iterative closest point (ICP) process may be performed to minimize the difference between the skeletonized image 1002 transformed by a given transformation and the respective skeletonized image 1010. In one embodiment, to perform an ICP process given two point sets (e.g., point sets of fingerprint ridges), $P=\{p_1, p_2, p_3, \ldots p_X\}$ and $Q=\{q_1, q_2, q_3, \ldots, q_Y\}$, the processing system finds the rigid transformation that minimizes the sum of squared error, as follows:

$$E(R, t) = \frac{1}{N}\sum_{i=0}^{N-1}\|p_i - Rq_i - t\|^2,$$

where $p_i$ and $q_i$ are corresponding points, and N is the total number of corresponding points.

At operator 1030, a pose search (e.g., exhaustive search) is not performed. Instead, only the M=25 transformations are analyzed, which greatly reduces the number of transformations that are analyze that this stage compared to performing an exhaustive search.

The single best transformation that is output 1032 by the operator 1030 is then applied to the first image to align the first image to the second image. Once the first image is aligned with the second image, the processing system can perform an analysis to determine whether the aligned first image matches the second image, such as whether there is a fingerprint match.

In some embodiments, a measure of alignment between images and/or a fingerprint match is determined by calculating a chamfer distance. Calculating a chamfer distance comprises computing a measure of difference between two images. In general, to compute a chamfer distance, a processing system extracts the edge/contours of a query image as well as the edge/contours of a target image, takes one point/pixel of contour in the query image and finds a distance of a closest point/pixel of contour in target image, and computes a sum the distances for all edge points/pixels of query image.

Figure 11:
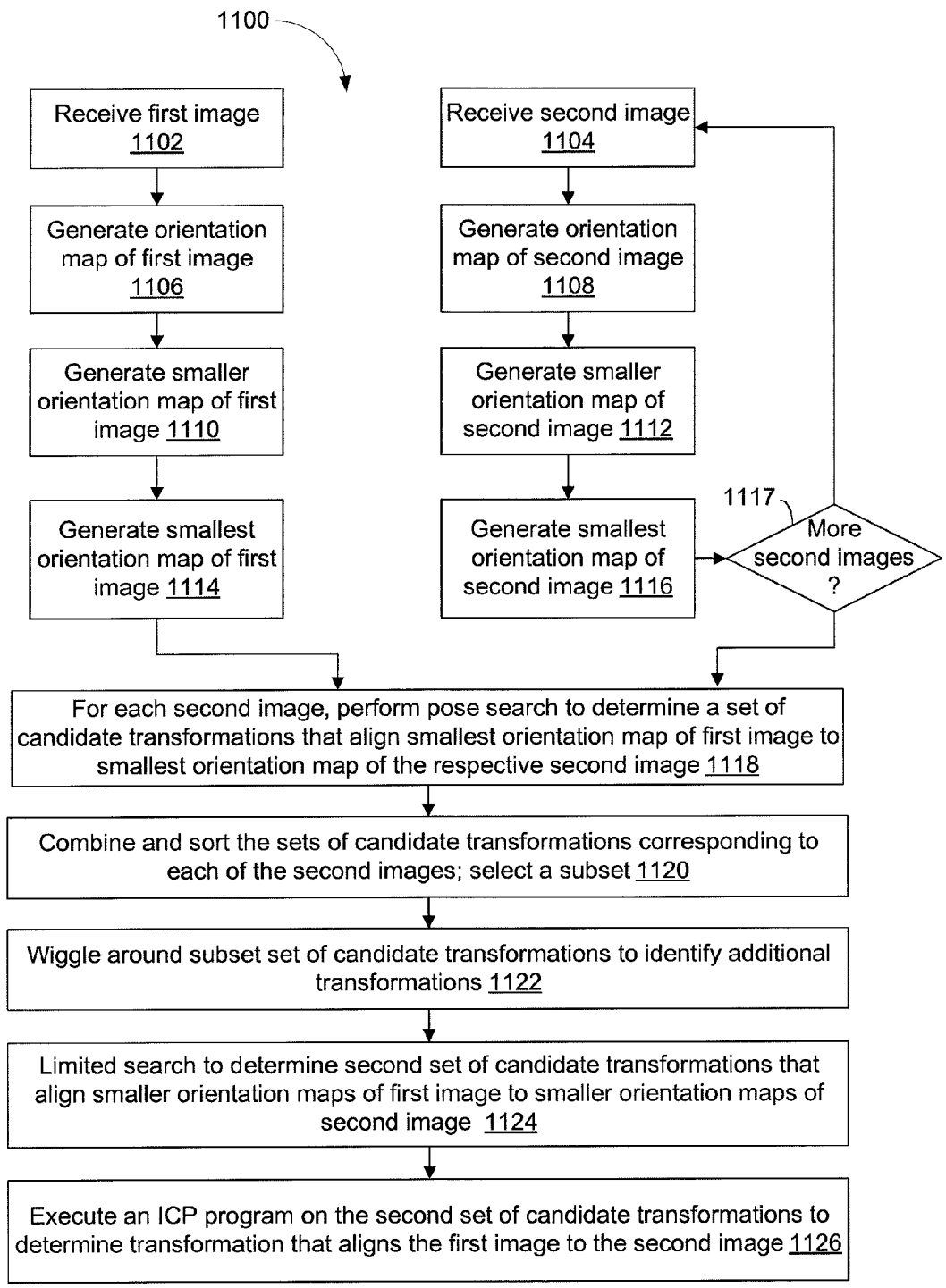
FIG. 11 is a flow diagram of a method for aligning two images using grouping, according to one embodiment of the disclosure.

FIG. 11 is a flow diagram of a method 1100 for aligning two images using grouping, according to one embodiment of the disclosure. At step 1102, a processing system receives a first image. At step 1104, the processing system receives a second image. In some embodiments, the first image is a newly acquired image captured by an image sensor, and the second image is a view of a template image that was previously acquired to which the first image is to be compared to determine whether there is a match.

In some embodiments, each of the first and second images are skeletonized biometric images. As such, appropriate pre-processing (not shown) may be performed to convert a grayscale image, such as a fingerprint image, to a skeletonized image. In some embodiments, converting the second image (i.e., the template image) to a skeletonized format is pre-computed by the processing system once and does not need to be recomputed each time that a newly acquired image is presented to compare to the second image.

At step 1106, the processing system generates an orientation map of the first image. In some embodiments, the orientation map of the first image has the same dimensions as the first image. At step 1108, the processing system generates an orientation map of the second image. In some embodiments, the orientation map of the second image has the same dimensions as the second image.

At step 1110, the processing system generates a smaller orientation map of the first image based on the orientation map of the first image. In some embodiments, the smaller orientation map of the first image is a smoothed and sampled version of the orientation map of the first image. As such, the smaller orientation map of the first image has smaller dimensions than the orientation map of the first image. Similarly, at step 1112, the processing system generates a smaller orientation map of the second image based on the orientation map of the second image.

At step 1114, the processing system generates a smallest orientation map of the first image based on the smaller orientation map of the first image. In some embodiments, the smallest orientation map of the first image is a smoothed and sampled version of the smaller orientation map of the first image. As such, the smallest orientation map of the first image has smaller dimensions than the smaller orientation map of the first image. Similarly, at step 1116, the processing system generates a smallest orientation map of the second image based on the smaller orientation map of the second image.

From step 1116, the method 1100 proceeds to step 1117, where the processing system determines whether any more second images remain to be processed. As described, there may be multiple views of multiple templates to which the first image can be compared. If yes, the method 1100 returns to step 1104 to process an additional second image. If no, then the method 1100 proceeds to step 1118.

In the example shown in FIG. 11, two stages of smoothing/sampling are performed. In other embodiments, any number of one or more smoothing/sampling stages can be performed. Also, it should be noted that the label "smallest" (as in "smallest orientation map of the first image") is merely a label, and it is possible to have even smaller representations of the first image that have smaller dimensions than the "smallest orientation map of the first image," as so-named in FIG. 11.

In addition, although steps 1102/1106/1110/1114 are shown to be performed in parallel with steps 1104/1108/

1112/1116, in other embodiments, steps 1102, 1104, 1106, 1108, 1110, 1112, 1114, 1116 can be performed serially or in any technically feasible order. Also, in some embodiments, steps 1104/1108/1112/1116 related to the second image(s) can be pre-computed by the processing system and are not recomputed each time that a newly acquired fingerprint image is received.

At step 1118, for each second image, the processing system performs a pose search to determine a set of candidate transformations that align the smallest orientation map of the first image (i.e., computed at step 1114) to the smallest orientation map of the respective second image (i.e., computed at step 1116). Performing a pose search, as used herein, involves testing each different transformation that can be applied to the smallest orientation map of the first image by brute force, also referred to as an exhaustive search. Since the smallest orientation maps have small dimensions, the number of possible transformations to search is relatively small, as compared to performing a pose search on the first and second images directly, which are larger images.

At step 1120, the processing system combines and sorts the sets of candidate transformations corresponding to each of the second images. A subset of candidate transformations is selected from the combined and sorted complete set, comprising the top number of the grouped and sorted transformations.

At step 1122, the processing system "wiggles" around the candidate transformations in the subset of candidate transformations to identify additional transformations. Each additional transformation that is identified has transformation parameters (e.g., x-translation, y-translation, rotation) that are within certain thresholds of the transformation parameters of one or more of the candidate transformations in the subset of candidate transformations.

At step 1124, the processing system performs a limited search to determine a second set of candidate transformations that align the smaller orientation map of the first image to the respective smaller orientation map of the second image. The search at step 1124 is "limited" because only the candidate transformations in the subset of candidate transformations and their corresponding "wiggles" are evaluated on the smaller orientation map of the first image. Doing so limits the number of transformations that are evaluated, as compared to performing a pose search (i.e., exhaustive search) on the smaller orientation map of the first image. In addition, in some embodiments the subset of candidate transformations and their corresponding "wiggles" are groups and sorted, and a top number of such candidate transformations is selected before performing step 1124.

At step 1126, the processing system executes an iterative closest point (ICP) program on each candidate transformations in the second set of candidate transformations to identify the candidate transformation that aligns the first image and the second image. As described, each of the candidate transformations in the second set of candidate transformations is applied to the first image, which is a skeletonized biometric image. The result is compared to the second image, which is also a skeletonized biometric image. A single transformation that results in the best alignment between the first image transformed by a candidate transformation and the second image is selected as the transformation that aligns the first image and the second image. Once the first image is aligned with the second image, the processing system can perform an analysis to determine whether the first image matches the second image, such as whether there is a fingerprint match. In some embodiments, the first image transformed by the transformation matches the second image if the difference metric is below a threshold amount.

Advantageously, embodiments of the disclosure provide an image alignment technique that can operate on relatively small images, such as those that have no minutiae points in common. Also, because an exhaustive search is performed only on the smallest coarse representation, and is not performed on the relatively larger skeletonized images, compute time needed to align the images is reduced. Further, because candidate transformations are grouped and sorted across multiple views, further processing efficiencies are achieved since fewer candidate transformations that have poor matching scores are evaluated.

The embodiments and examples set forth herein were presented in order to best explain the present disclosure and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for biometric image alignment, comprising:
receiving an input image of a biometric object;
identifying a plurality of sets of candidate transformations, wherein each set of candidate transformations included in the plurality of sets of candidate transformations aligns the input image to a different enrollment image included in a plurality of enrollment images;
grouping the plurality of sets of candidate transformations into a combined set of candidate transformations;
selecting a subset of candidate transformations from the combined set of candidate transformations; and
identifying a first transformation based on the selected subset of candidate transformations, wherein the first transformation aligns the input image to a first enrollment image included in the plurality of enrollment images.

2. The method of claim 1, further comprising:
sorting the combined set of candidate transformations,
wherein selecting the subset of candidate transformations comprises selecting a top number of candidate transformations from the sorted combined set of candidate transformations.

3. The method of claim 2, further comprising:
for each given candidate transformation included in the plurality of sets of candidate transformations, computing a difference metric between the input image and a given enrollment image included in the plurality of enrollment images that corresponds to the given candidate transformation,
wherein sorting the combined set of candidate transformations is based on the difference metric for each given candidate transformation.

4. The method of claim 1, wherein identifying the plurality of sets of candidate transformations comprises:
for a given enrollment image included in the plurality of enrollment images, computing a distance metric between the input image and the given enrollment image at a plurality of possible transformations that align the input image with the given enrollment image; and
identifying a smaller set of candidate transformations out of the plurality of possible transformations, wherein the smaller set of candidate transformations minimize the difference metric between the input image and the given enrollment image.

5. The method of claim 1,
wherein, before the grouping, the plurality of sets of candidate transformations are identified using a first stage of alignment;
wherein, after the grouping, the first transformation is identified using a second stage of alignment;
wherein the first stage of alignment is coarser than the second stage of alignment.

6. The method of claim 1, further comprising:
generating a first representation of the input image; and
generating a second representation of the input image,
wherein, before the grouping, the plurality of sets of candidate transformations are identified based on a difference metric calculated using the first representation of the input image, wherein, after the grouping, the first transformation is identified based on a difference metric calculated using the second representation of the input image.

7. The method of claim 6,
wherein the first representation of the input image has a lower resolution than the second representation of the input image.

8. The method of claim 6,
wherein the first representation of the input image is an orientation map of the input image; and
wherein the second representation of the input image is a skeletonized representation of the input image.

9. The method of claim 6,
wherein the first representation of the input image is a representation of a set of points of interest in the input image.

10. The method of claim 1, further comprising:
applying the first transformation to align the input image with of the first enrollment image; and
computing a matching score between the input image and the first enrollment image based on a difference metric between the input image and the first enrollment image with the first transformation applied.

11. The method of claim 10, further comprising:
determining whether the computed matching score is above or below an authentication threshold; and
either allowing access or denying access to a computing device based on whether the computed matching score is above or below the authentication threshold.

12. The method of claim 1, further comprising:
capturing the input image of the biometric object with a biometric sensor.

13. The method of claim 1, wherein each enrollment image in the plurality of enrollment images corresponds to a single enrolled fingerprint.

14. The method of claim 1, wherein each enrollment image in the plurality of enrollment images corresponds to a different enrolled fingerprint.

15. A device, comprising:
a biometric sensor configured to capture an input image of a biometric object; and
a processing system configured to:
receive the input image of the biometric object;
identify a plurality of sets of candidate transformations, wherein each set of candidate transformations included in the plurality of sets of candidate transformations aligns the input image to a different enrollment image included in a plurality of enrollment images;
group the plurality of sets of candidate transformations into a combined set of candidate transformations;
select a subset of candidate transformations from the combined set of candidate transformations; and
identify a first transformation based on the selected subset of candidate transformations, wherein the first transformation aligns the input image to a first enrollment image included in the plurality of enrollment images.

16. The device of claim 15, wherein the processing system is further configured to:
sort the combined set of candidate transformations,
wherein selecting the subset of candidate transformations comprises selecting a top number of candidate transformations from the sorted combined set of candidate transformations.

17. The device of claim 16, wherein the processing system is further configured to:

for each given candidate transformation included in the plurality of sets of candidate transformations, compute a difference metric between the input image and a given enrollment image included in the plurality of enrollment images that corresponds to the given candidate transformation, wherein sorting the combined set of candidate transformations is based on the difference metric for each given candidate transformation.

18. The device of claim 15, wherein identifying the plurality of sets of candidate transformations comprises:

for a given enrollment image included in the plurality of enrollment images, computing a difference metric between the input image and the given enrollment image at a plurality of possible transformations that align the input image with the given enrollment image; and identifying a smaller set of candidate transformations out of the plurality of possible transformations, wherein the smaller set of candidate transformations minimize the difference metric between the input image and the given enrollment image.

19. The device of claim 15, wherein the processing system is further configured to:

generate a first representation of the input image; and
generate a second representation of the input image,
wherein, before the grouping, the plurality of sets of candidate transformations are identified based on a difference metric calculated using the first representation of the input image,
wherein, after the grouping, the first transformation is identified based on a difference metric calculated using the second representation of the input image.

20. The device of claim 19,
wherein the first representation of the input image is an orientation map of the input image; and
wherein the second representation of the input image is a skeletonized representation of the input image.

21. The device of claim 19,
wherein the first representation of the input image is a representation of a set of points of interest in the input image.

22. A non-transitory computer-readable storage medium storing instructions that, when executed by a processor, cause a computing system to perform biometric image alignment, by performing the steps of:

receiving an input image of a biometric object;
identifying a plurality of sets of candidate transformations, wherein each set of candidate transformations included in the plurality of sets of candidate transformations aligns the input image to a different enrollment image included in a plurality of enrollment images;
grouping the plurality of sets of candidate transformations into a combined set of candidate transformations;
selecting a subset of candidate transformations from the combined set of candidate transformations; and
identifying a first transformation based on the selected subset of candidate transformations, wherein the first transformation aligns the input image to a first enrollment image included in the plurality of enrollment images.

23. A device, comprising:
a biometric sensor configured to capture an input image of a biometric object; and
a processor configured to:
receive the input image of the biometric object;
identify a plurality of sets of candidate transformations, wherein each set of candidate transformations included in the plurality of sets of candidate transformations aligns the input image to a different enrollment image included in a plurality of enrollment images;
group the plurality of sets of candidate transformations into a combined set of candidate transformations;
select a subset of candidate transformations from the combined set of candidate transformations; and
identify a first transformation based on the selected subset of candidate transformations, wherein the first transformation aligns the input image to a first enrollment image included in the plurality of enrollment images.

24. The device of claim 23, wherein the processor is further configured to:
sort the combined set of candidate transformations,
wherein selecting the subset of candidate transformations comprises selecting a top number of candidate transformations from the sorted combined set of candidate transformations.

25. The device of claim 24, wherein the processor is further configured to:
for each given candidate transformation included in the plurality of sets of candidate transformations, compute a difference metric between the input image and a given enrollment image included in the plurality of enrollment images that corresponds to the given candidate transformation,
wherein sorting the combined set of candidate transformations is based on the difference metric for each given candidate transformation.

26. The device of claim 23, wherein identifying the plurality of sets of candidate transformations comprises:
for a given enrollment image included in the plurality of enrollment images, computing a difference metric between the input image and the given enrollment image at a plurality of possible transformations that align the input image with the given enrollment image; and
identifying a smaller set of candidate transformations out of the plurality of possible transformations, wherein the smaller set of candidate transformations minimize the difference metric between the input image and the given enrollment image.

27. The device of claim 23, wherein the processor is further configured to:
generate a first representation of the input image; and
generate a second representation of the input image,
wherein, before the grouping, the plurality of sets of candidate transformations are identified based on a difference metric calculated using the first representation of the input image,
wherein, after the grouping, the first transformation is identified based on a difference metric calculated using the second representation of the input image.

28. The device of claim 27,
wherein the first representation of the input image is an orientation map of the input image; and
wherein the second representation of the input image is a skeletonized representation of the input image.

29. The device of claim 27,
wherein the first representation of the input image is a representation of a set of points of interest in the input image.

* * * * *